Patented Jan. 19, 1926.

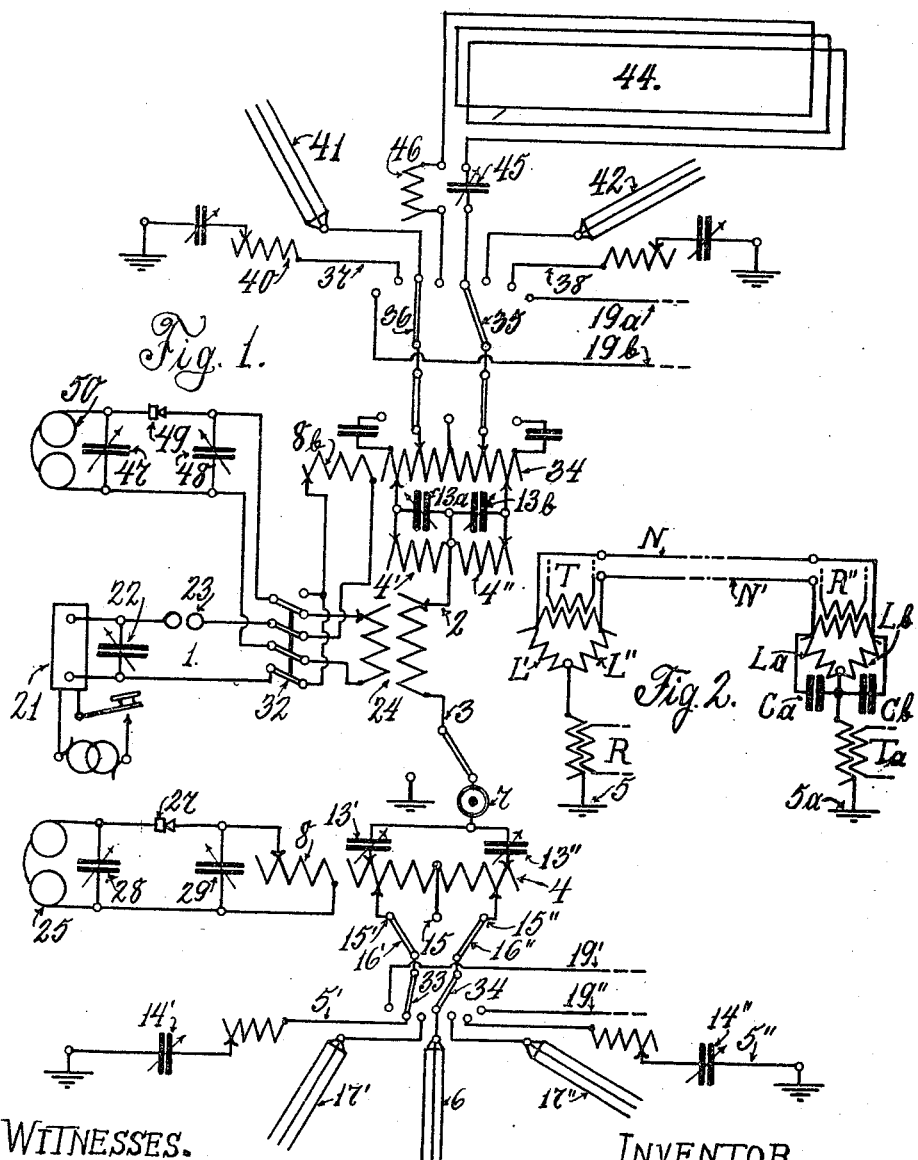

1,570,261

UNITED STATES PATENT OFFICE.

AUGUST J. KLONECK, OF NEW YORK, N. Y.

SIMULTANEOUS SENDING AND RECEIVING SYSTEM.

Application filed May 12, 1921. Serial No. 468,935.

*To all whom it may concern:*

Be it known that I, AUGUST J. KLONECK, a citizen of the United States, residing at New York, in the county of New York and State of New York, have invented certain new and useful Improvements in Simultaneous Sending and Receiving Systems, of which the following is a specification.

This invention relates to simultaneous sending and receiving systems and has for its object to provide means whereby a high power current may be transmitted and simultaneously a feeble signal current received without disturbance of the receiving instruments and circuits.

Another object of the invention is to provide means whereby various types of aerials may selectively be used to obtain certain directional effects in transmitting or receiving signals and to utilize the apparatus for transmission and receipt of signals connected by line wires.

A further object of the invention is to provide a suitable connection of line wires between two similar stations whereby such system may be employed for signaling by aerial or by line wires.

These and other allied objects are attained by a novel combination of parts hereinafter described and shown in the drawings in which:—

Figure 1 shows an arrangement of electrical circuits and elements embodying my invention. Figure 2 shows an arrangement of electrical circuits and elements as preferably employed between wire connected stations. Only necessary elements have been shown in connection with these figures and it is understood that the transmitting apparatus and receiving instruments employed may be as convenient, or desired.

This application embodies the general principles of the system of simultaneous duplex signaling shown in my copending application filed Nov. 28, 1916, Serial No. 133,886, Patent No. 1,526,308, for simultaneous signaling and receiving systems for which division was requested, and other features added therewith to make the same more useful.

In Figure 1, the numeral 1 represents a high frequency current generator of any suitable combination of elements, the one shown comprising a primary or secondary source of electrical current or a transformer 21, a condenser 22 and a spark gap 23 in circuit with a high frequency transformer 8$^b$, 34 to the aerials or by a transformer 24 by means of a switch 32 whereby said circuits are similar in operation to the mentioned previous application. The secondary of said transformer 24 is connected with one terminal 3 thereof to ground, if it is not desired to use the aerial arrangements at both terminals of the transmitting transformer 24, or not using the receiver 8—25 in connection with transformer 24, otherwise the terminal 3 is connected through a transmitting instrument 7 which may be a microphone intermediate two condensers 13' and 13''. Each of the latter is connected to another end of a receiving coil 4 and further to one of the switch points 15' and 15'' connecting by switches 16' and 16'' to aerial or line selecting switches 33 and 34. Each of said switches 33 and 34 may be connected to certain radio conductors of which 5' and 5'' are horizontal wires comprising the condensers 14' and 14'' extending substantially from different directions and then grounded or connected to a common means such as railroad rails at a suitable distance from one another forming a grounded return circuit for the same; 17' and 17'' and 6 are aerials extending preferably horizontally upon the earth and in different directions which however may be such as to produce a resultant effect of transmitting to or receiving from a certain direction as such horizontal aerials have a certain directional effect of utility; 19' and 19'' denote line wires which are connected to another station as will be more particularly pointed out in connection with Figure 2. Said coil 4 of the receiving transformer has also an intermediate point thereof connected to a switch point 15. In this case one aerial 6 is employed in combination with a grounded balancing wire 5' to receive signals from another station by flowing in the direction from aerial 6 to ground. Otherwise the wires are substitutes for costly aerials. But if it is not possible to obtain a good ground, then ungrounded aerials may be employed as shown at all terminals of the transmitting and receiving circuits. By connecting switch 16'' to the intermediate terminal 15 of coil 4 as described in said mentioned previous application, then a transmitting current from transformer 24 will surge through the condensers 13', 13'' and then in opposing directions through the coil 4 to terminal 15 and aerial 6 for instance, while the wire 5' serves as a bypass for currents only. The bypass circuit 5', 13', 4, 15, 6, 14' may be tuned to the frequency of receiving signals, which may thus be independent of the transmitting current of circuit 6, 15, 13' and 13" to 3, 24, which latter will not energize the coils 4 and 8 of the receiving circuit. The wires 5' and 5" extend in different directions to obtain a directive effect for transmitting and receiving signals from another station if desired and to reduce static current interferences in reception of signals by the grounded wires 5' and 5".

Said receiving coil 4 co-operates with a secondary coil 8 which latter is connected to a receiver 25 in a circuit including condensers 28, 29 and a wave detector 27.

The other terminal 2 of transformer 24 is also connected to a similar conductor system as terminal 3, but slightly modified. It is connected intermediate two condensers $13^a$ and $13^b$ and two coil parts 4' and 4" which terminate to the ends of another receiving coil 34 and further to two switches 35 and 36. The latter are connectible with certain other transmitting and receiving conductors including two grounded conductors 37 and 38 by means of suitable condensers and inductances 40 adapted for tuning the circuits to a desired frequency and wave length; also two horizontal aerials 41 and 42 extending preferably at a right angle from one another, further a coil aerial 44 which is arranged in a manner whereby a directive effect of transmission of signals is also obtained by the same and also line wires $19^a$ and $19^b$. The transformer coil 34 which will be employed for transmission and reception of signals has a cooperating secondary coil $8^b$ connected at this instant by said mentioned switch 32 to said transmitting circuit while a receiving circuit including condensers 47, 48, a detector 49 and a receiving instrument 50 is connected to transformer 24. It will be noted that the transformers 24 and 34 are interchangeable as transmitting and receiving transformers by means of switch 32 and thus either one may be employed for this purpose. By connecting two stations by line wires to identical terminals of similar apparatus such system would be practically inoperative, as the terminals of coil 34 for instance, if transformer 24 is employed for transmission are energized from one terminal of the source of current or from terminal 2 only for instance, thus no resultant effect is produced in any of the receiving coils 34 at either station. This will be obviated by employing coil 24 at one station for transmission and coil 34 at the other station for transmitting signals by means of switch 32. The other coils may be employed for reception of signals as shown in Figure 2.

In Figure 2, a transmitting transformer T is shown connected by two similar inductances L' and L" to a common terminal which leads through a receiving coil R to ground 5. It will be noted that inductances L' and L" admit two opposing current poles or phases to coil R which will neutralize each other and not produce a resultant energizing effect upon the receiving coil R of the same station. The transmitting transformer T is also connected by line wires N and N' to two receiving transformer coils R" of a second station and further through suitable inductances $L^a$, $L^b$ and condensers $C^a$ and $C^b$ to one another or to ground $5^a$, if desired, which latter circuit includes the transmitter $T^a$ of the second station. The transmitting transformer $T^a$ of the second station similarly energizes the receiving transformer R" of its station by one current phase only which flows in equal strength to both terminals of said receiving transformer and to the first station and thus does not produce a resultant effect in its own receiver R" but operates the receiver R in the first station.

The operation of Figure 1 with transformer 34 employed for receiving is similar to that of Figure 2. If transformer 24 is transmitting there will flow a current from one terminal of transformer 24 only through coils 34 and 4 in two opposed directions and thus not produce a resultant magnetic energizing effect upon coils 8 or $8^b$ of the two receiving circuits, while a radiated energy from another station will flow from one of the aerial to another aerial if a directive effect is obtained, that is, the aerials form a complete radiation circuit between one another, as for instance the aerials 41 and 42, or a reception by the coil aerial 44 which latter if formed of a long horizontal coil will receive from a certain direction by forming a receiving circuit within its coil and energizing the receiving coil 34 in this instance, while condenser 45 and inductance 46 may serve for suitably tuning the same to a desired receiving frequency. Also the distantly grounded wires 37 and 38 are energized by radiating energy since this circuit may have less resistance to electrical energy from certain directions than the earth or other conductors and thus energize coil 34. Or one of the aerials may be employed at one terminal of coil 34 and a ground at the other terminal and thus energize the same. It is clear that the various circuits should be tuned to a desired frequency and in this case the coil 34 forms a separate circuit and may thus be tuned to a frequency different from that of the transmitting frequency. A directional effect for transmitting and receiving signal currents is obtained by employing aerial coil 44 for reception of energy from a certain direction while it serves for one terminal of the transmitting circuit, or vice versa, it will only be energized by transmitting current from one terminal of transformer 24 which will flow in opposed directions through the coil 44 and the receiving circuit and thus not energize the local receiving circuit; and by employing a long horizontal coil 44 as mentioned above then the whole coil will act as a simple horizontal or a so-called inverted L aerial for transmission and thus also produce a directional effect in transmitting electrical signal energy.

By employing coil 34 for transmission of signals it will be noted that the same will produce two currents of opposite polarities at one terminal 2 of coil 24 but no potential difference and consequently no resultant energizing effect upon coil 24 which thus may be employed for reception of signals while coil 34 is employed for transmission or vice versa.

It is to be further noted that if two aerials are arranged close together they may be energized by one current pole to produce a directional effect in the direction of the aerials. By arranging the aerials one half wave length apart they may, by energizing the same by opposite current poles produce a similar effect, while by changing the energization to one pole energization, then the ½ wave length separated aerials will produce a minimum effect of radiation at a right angle to the direction of the aerials, as desired.

It is clear that for a simple duplex system the number of aerials may be reduced to any desired combination of transmitting and receiving circuits.

Having now fully described my invention, I claim as new and desire to secure by Letters Patent the following:—

1. A means for simultaneously sending and receiving electrical signals, including an aerial to aerial circuit for transmitting and a directive aerial to aerial circuit for receiving, one of said aerial circuits forming a terminal for the other of said circuits and being common for both circuits, said second mentioned circuit consisting of two branches of equal reactance having a connection at the branching point for said first mentioned circuit.

2. A means for simultaneously transmitting and receiving signals, including an aerial circuit for transmitting and an aerial circuit for receiving, one of said aerial circuits being common for both of said circuits, the other of said circuits terminating in said common aerial circuit, and being connected through opposing impedance elements to two points of equal potential and reactance for a zero energization of said mentioned common aerial circuits.

3. A means for simultaneously transmitting and receiving electrical signals, including a plurality of conductors including an aerial conductor, a transmitting circuit formed between said aerial and another conductor and between others of said conductors, a receiving circuit formed between said aerial and said first mentioned conductor; the latter including an undivided coil connected between said aerial and said conductor, said transmitting circuit being connected through balancing inductances in multiple to said coil and between said aerial and said conductor adapted for producing two equal but opposed energizations upon the receiving circuit for not energizing said receiving circuit, substantially as described.

4. A means for simultaneously sending and receiving electrical signals, including an aerial connected through a coil part to another conductor formed circuit, and a second circuit including other conductors at one terminal and extending through a second coil then through separate impedances to the two ends of said coil of said first mentioned circuit for the other terminal of said second mentioned circuits, said circuits being a sending circuit and a receiving circuit.

5. A means for simultaneously sending and receiving electrical signals, comprising transmitting and receiving circuits and apparatus including a plurality of conductors, the latter including certain of said conductors extending substantially parallel to the earth including a coil connected therebetween, said coil forming an operating means for one of said circuits, said coil having its terminals connected to two of said last mentioned conductors and in multiple thereof through balancing reactance elements to one terminal of an operating means for another of said circuits and through the latter to the suitable others of said conductors for the other terminal of said second mentioned circuit, said mentioned two circuits serving one for sending and one for receiving signals.

6. A means for simultaneously sending and receiving electrical signals, comprising sending and receiving circuits including a plurality of conductors, a pair of said conductors extending horizontally and in different directions forming one terminal of one of said circuits by means of balancing reactance elements arranged from said mentioned terminal to said pair of conductors and through a local circuit operating means to another conductor system for the other terminal of said circuit, and an operating coil for a second circuit connected between the pair of said conductors, the latter forming the two terminals of said second mentioned circuit, said mentioned two circuits including a sending circuit and a receiving circuit.

7. A means for simultaneously sending and receiving electrical signals, including a sending and a receiving circuit including a plurality of conductors, certain of said conductors being formed to provide a radiation energy coil connected to an apparatus operating coil for one of said circuits and in multiple thereof through reactance elements to one terminal of an operating means for a second of said circuits, the latter comprising others of said conductors for forming a second terminal for said second mentioned circuit, all for the purpose set forth.

8. In a means for simultaneously operating a plurality of independent electrical signal circuits, transmitting or receiving circuits and apparatus including condensers and coils, a plurality of conductors operatively connected therewith, certain of said conductors serving for one terminal of one of said circuits forming a radiation coil in operative connection with another of said circuits, the latter including an independent operating means for cooperation with said radiation coil of said second mentioned circuit, said radiation coil being also connected at its terminals to reactance elements and by the latter to said mentioned terminal of an operating means for said first mentioned circuit including a suitable system of conductors for the other terminal of said last mentioned circuit, said radiation coil extending longitudinally in one direction adapted to produce a directive effect for both of said circuits, and means for operating said circuits for signals of any desired frequency independently from one another, said first mentioned circuit being connected to a point of zero energization into said second mentioned circuit.

9. As a means for operating a plurality of independent signal circuits simultaneously by common energy radiating conductors, the combination, of a plurality of radiating conductors and interconnected circuits, including conveniently sending and receiving circuits, one of said circuits including local circuits operating coils connected to certain of said radiating conductors adapted to form an independent circuit therebetween, the other of said circuits having one terminal of its local circuit operating means connected by means of reactance elements to the end parts of the coils of said first mentioned circuit and the other terminal thereof connected to certain others of said conductors, separately from the conductors of the first mentioned circuit, all of said conductors being active and in nonartificial balancing circuits.

10. As a means for sending and receiving electrical signals simultaneously the combination, of a plurality of actively communicating conductors and circuits including a transmitting and a receiving circuit particularly and apparatus, one of said circuits comprising operating coils for its apparatus having the outside ends of said coils connected to an independent circuit forming system of said conductors, the other of said circuits comprising its apparatus operating means connected to all of said conductors in a system whereby one terminal of said operating means is connected by suitable reactance elements through said two ends of said operating coils to said conductors of the first mentioned circuit whereby the first mentioned operating coils are connected at both ends to one terminal of said operating means of the second mentioned circuit by means of said reactances for preventing an energization of one of said circuits by the other of said circuits while said apparatus operating means of the second mentioned circuit is connected to two opposing ends of the coils of the first mentioned circuits.

11. A means for transmitting and receiving signals of any current frequency simultaneously, including local circuits and apparatus and common radio circuits comprising radio conductors at the terminals and operating means included in said radio circuits for operating said local circuits, including a terminal of the operating means of one radio circuit connected to the operating means of another of said radio circuits by means of equal reactance parts and to separate of said conductors, said last mentioned operating means having one terminal connected to one of said conductors and the other terminal and an intermediate terminal selectively connectible to another of said conductors.

12. In a means for simultaneously operating a plurality of signal circuits independently of one another and at any desired frequency the combination, of a plurality of conductively connected but operatively independent circuits including energy conductors and operating means for local circuits arranged between said conductors, one of said operating means including a terminal, which is connected by means of condensers to equal but opposing points of another of said operating means and to two of said conductors, said last mentioned two conductors and said second mentioned operating means forming an independent circuit therebetween, all for the purpose set forth.

In testimony whereof, I have signed my name to this specification this 7th day of May, 1921.

AUGUST J. KLONECK.